United States Patent
Bhatt et al.

(10) Patent No.: US 9,465,783 B2
(45) Date of Patent: *Oct. 11, 2016

(54) REAL TIME TERM SUGGESTION USING TEXT ANALYTICS

(71) Applicant: International Business Machines Corporation, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 13/741,327

(22) Filed: Jan. 14, 2013

(65) Prior Publication Data

US 2014/0108924 A1    Apr. 17, 2014

Related U.S. Application Data

(63) Continuation of application No. 13/649,342, filed on Oct. 11, 2012.

(51) Int. Cl.
| | |
|---|---|
| *G06F 17/00* | (2006.01) |
| *G06F 17/24* | (2006.01) |
| *G06F 17/22* | (2006.01) |
| *G06F 17/27* | (2006.01) |
| *G06F 17/28* | (2006.01) |

(52) U.S. Cl.
CPC ............ *G06F 17/24* (2013.01); *G06F 17/2276* (2013.01); *G06F 17/2795* (2013.01); *G06F 17/273* (2013.01); *G06F 17/28* (2013.01)

(58) Field of Classification Search
CPC .......................... G06F 17/273; G06F 17/2795
USPC ..................................... 715/234, 271
See application file for complete search history.

(56) References Cited

U.S. PATENT DOCUMENTS

| | | | |
|---|---|---|---|
| 4,916,633 A | 4/1990 | Tychonievich et al. ...... 364/513 |
| 5,978,820 A * | 11/1999 | Mase ............... G06F 17/30719 |
| | | | 707/E17.094 |
| 6,006,225 A | 12/1999 | Bowman et al. ................. 707/5 |
| 6,510,551 B1 | 1/2003 | Miller ............................ 717/114 |
| 6,513,027 B1 * | 1/2003 | Powers et al. .................. 706/47 |
| 7,814,101 B2 | 10/2010 | Bitsch ............................ 707/736 |
| 7,949,949 B2 | 5/2011 | Simonyi et al. .............. 715/249 |
| 8,155,949 B1 | 4/2012 | Rubin .............................. 704/9 |

(Continued)

OTHER PUBLICATIONS

Friedman et al., "GENIES: a natural-language processing system for the extraction of molecular pathways from journal articles," Bioinformatics vol. 17 Suppl 1, Jan. 2001, pp. S74-S82.

(Continued)

*Primary Examiner* — Andrew McIntosh
(74) *Attorney, Agent, or Firm* — VanLeeuwen & VanLeeuwen; Joseph C. Polimeni

(57) ABSTRACT

An approach is provided in which a conversion manager receives a conversion request that identifies a conversion mode corresponding to a first category and a second category. The conversion manager identifies one or more first terms corresponding to the first category that are included in a page of text. As such, the conversion manager selects one or more second terms corresponding to the second category and, in turn, replaces the first terms with their corresponding second terms.

7 Claims, 11 Drawing Sheets

(56) References Cited

U.S. PATENT DOCUMENTS

| | | | |
|---|---|---|---|
| 8,201,139 B2 | 6/2012 | Chang et al. | 717/104 |
| 8,214,346 B2 | 7/2012 | Pradhan et al. | 707/706 |
| 2004/0199491 A1 | 10/2004 | Bhatt | 707/2 |
| 2005/0234879 A1 | 10/2005 | Zeng et al. | 707/3 |
| 2006/0106769 A1* | 5/2006 | Gibbs | 707/3 |
| 2006/0247914 A1* | 11/2006 | Brener et al. | 704/1 |
| 2006/0248078 A1 | 11/2006 | Gross et al. | 707/5 |
| 2007/0192305 A1 | 8/2007 | Finley et al. | 707/4 |
| 2009/0055412 A1* | 2/2009 | Cooley | H04L 51/12 |
| 2012/0011170 A1 | 1/2012 | Elad et al. | 707/804 |

OTHER PUBLICATIONS

Smadja, "Retrieving Collocations from Text: Xtract," Journal Computational Linguistics—Special issue on using large corpora: I, vol. 19, Issue 1, Mar. 1993, pp. 143-177.

Schulz et al., "Biomedical Text Retrieval in Languages with a Complex Morphology," Proceedings of the Workshop on Natural Language Processing in the Biomedical Domain, Philadelphia, PA, Jul. 2002, pp. 61-68.

Edgington, "Introducing Text Analytics as a Graduate Business School Course—Executive Summary," Journal of Information Technology Education; Innovations in Practive, vol. 10, 2011, pp. 207-234.

Zhu et al., "Introducing OmniFind Analytics Edition: Customizing for Text Analytics"; International Business Machines Corporation, Redbooks, First Edition; Jun. 2008, 346 pages.

IBM, "Root Cause Analysis Support Tool by using Text Analytics;" IPCOM000189572D; ip.com PriorArtDatabase, Nov. 13, 2009, 2 pages.

IBM, "Highlighting Search Term History in Search Results,"IPCOM000187009D; ip.com PriorArtDatabase, Sep. 1, 2009, 7 pages.

Kawazoe et al., "Structuring an event ontology for disease outbreak detection," Proceedings of the Second International Symposium on Languages in Biology and Medicine (LBM), Singapore, Apr. 2008, 6 pages.

Martin et al., "Transportability and Generality in a Natural-language Interface System," Proceedings of the Eighth International Joint Conference on Artificial Intelligence, Karlsruche, West Germany, Aug. 1983, 22 pages.

* cited by examiner

400 —

Date: August 2, 2012

Patient name: John Doe

Summary:
John arrived in ER with symptoms of a heart attack. From his prior visits, he also has high blood pressure and irregular heartbeat. Upon further medical examination, a test to diagnose heart attack and blood test were performed. Based on test result, Dr decided to perform a test to determine artery blockage.

Dr. Robert Smith, MD

Date: August 2, 2012

Patient name: John Doe

Summary:
John arrived in ER with symptoms of myocardial infraction. From his prior visits, he also has hypertension and atrial fibrillation. Upon further medical examination, electrocardiogram and blood test were performed. Based on test result, Dr decided to perform angiogram.

Dr. Robert Smith, MD

FIG. 4B

REAL TIME TERM SUGGESTION USING TEXT ANALYTICS

BACKGROUND

The present disclosure relates to automatically replacing laymen terms included in a document to domain-specific terms and vice versa.

A user typically writes documents in a manner in which they are comfortable. Some users write documents with simple laymen terms, while other users write documents with complex domain-specific terms. For example, a medical doctor may write letters using complex terms from a "medical" domain, whereas a lawyer may write letters using complex terms from a "legal" domain.

In certain situations, depending on a user's audience, the user may wish to change the style of a particular document to include a different amount of laymen terms or a different amount of complex, domain specific terms. A user may write a scientific or medical article but is not an expert on the subject area. In order to have the article sound professional, the user may wish to replace laymen terms with medical terms. In another example, a user may wish to write an email to a lawyer and would like the letter to be written in a way that conveys legal terminology instead of laymen terminology. Similarly, an attorney may write a letter using legal terminology and would like the letter to be understandable to a layperson.

BRIEF SUMMARY

According to one embodiment of the present disclosure, an approach is provided in which a conversion manager receives a conversion request that identifies a conversion mode corresponding to a first category and a second category. The conversion manager identifies one or more first terms corresponding to the first category that are included in a page of text. As such, the conversion manager selects one or more second terms corresponding to the second category and, in turn, replaces the first terms with their corresponding second terms.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIGS. 4A and 4B are diagrams showing conversion manager 100 converting laymen terms to complex terms in a non-real time processing mode environment;

DETAILED DESCRIPTION

Figure 1:
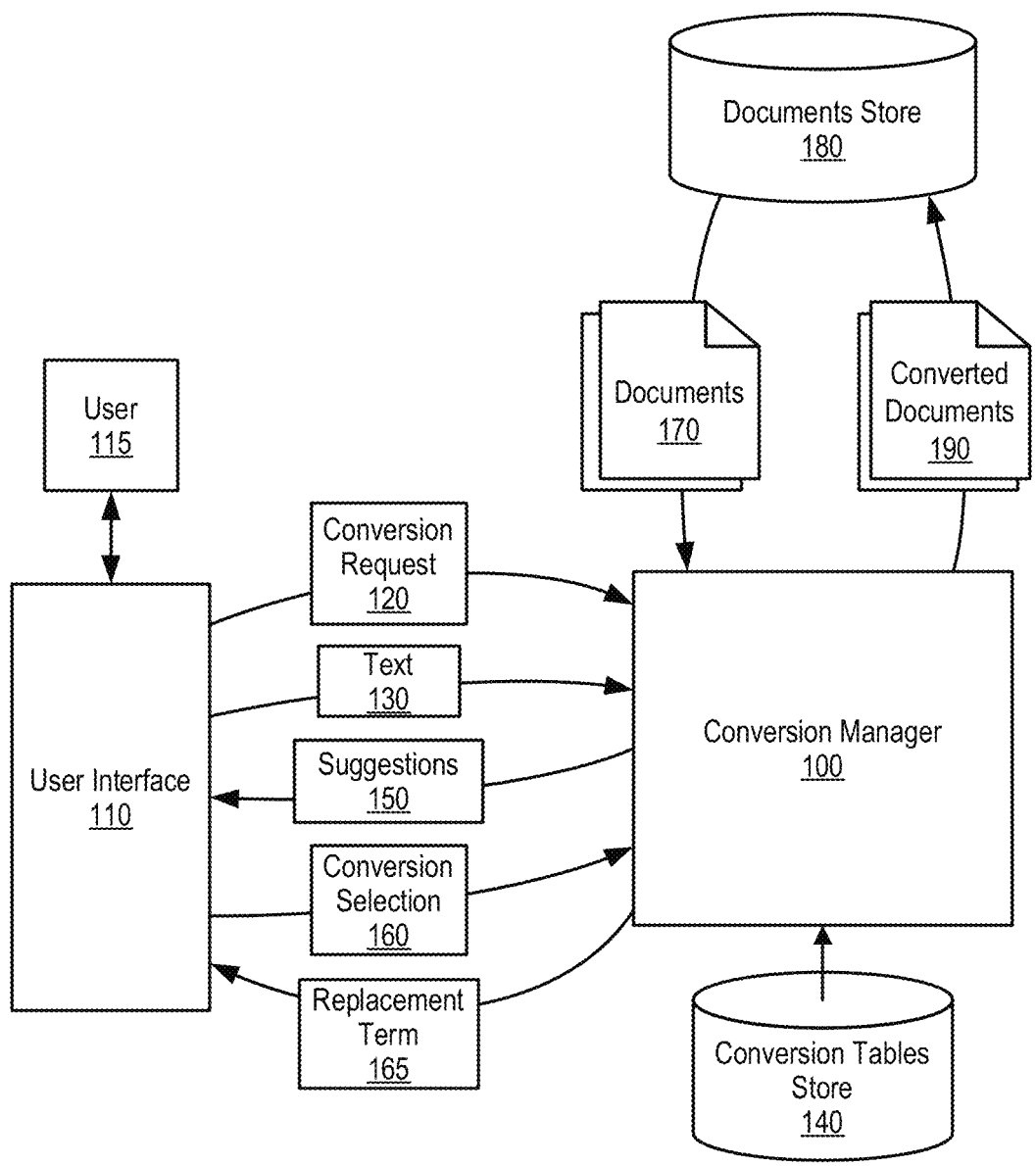
FIG. 1 is a diagram showing a conversion manager converting laymen terms to domain-specific terms and vice versa in both a real time environment and a non-real time environment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a conversion manager converting laymen terms to domain-specific terms and vice versa in both a real time environment and a non-real time environment.

Conversion manager 100 provides user interface 110 to user 115 on a display, which includes various conversion options for user 115 to select. In one embodiment, user interface 110 provides a conversion mode selection, a domain type selection, and a processing mode selection. The conversion mode selection allows user 115 to select a laymen conversion (convert complex terms to laymen terms) or a complex conversion (convert laymen terms to complex terms). The domain type selection allows a user to select a particular domain type (e.g., technical, medical, etc.) or an "auto-detect" domain type that instructs conversion manager 100 to analyze a page of text and determine the page of text's particular domain type. In one embodiment, conversion manager 100 may use a technology such as UIMA (Unstructured Information Management Architecture) during text analysis.

The processing mode selection allows a user to select a real-time processing mode or a non-real time processing mode. The real-time term processing mode, in one embodiment, involves monitoring user 115's text entry and offering conversion solutions when conversion manager 100 identifies a term that is convertible according to user 115's other selections (conversion mode, domain type selection, etc.). The non-real time processing mode, in one embodiment, involves conversion manager 100 retrieving one or more documents and automatically converting terms in the documents (page of text) according to user 115's other selections (see FIG. 2 and corresponding text for further details).

User 115 selects various options in user interface 110, which user interface 110 sends to conversion manager 100 as conversion request 120. Conversion manager 100 determines whether user 115 selected real-time processing mode (real-time conversion) or non-real time processing mode (non-real time conversion). During a real-time conversion, conversion manager 100 monitors text 130 that is input by user 115 (e.g., through a word-processing application). Conversion manager 100 accesses a conversion table in conversion tables store 140 that corresponds to user 115's domain type selection (e.g., medical domain). When conversion manager 100 identifies a convertible term based upon user 115's conversion mode selection (laymen terms or complex terms), conversion manager 150 provides suggestions 150 to convert the term, such as through a drop down menu (see FIGS. 3A, 5, and corresponding text for further details).

Figure 3A:
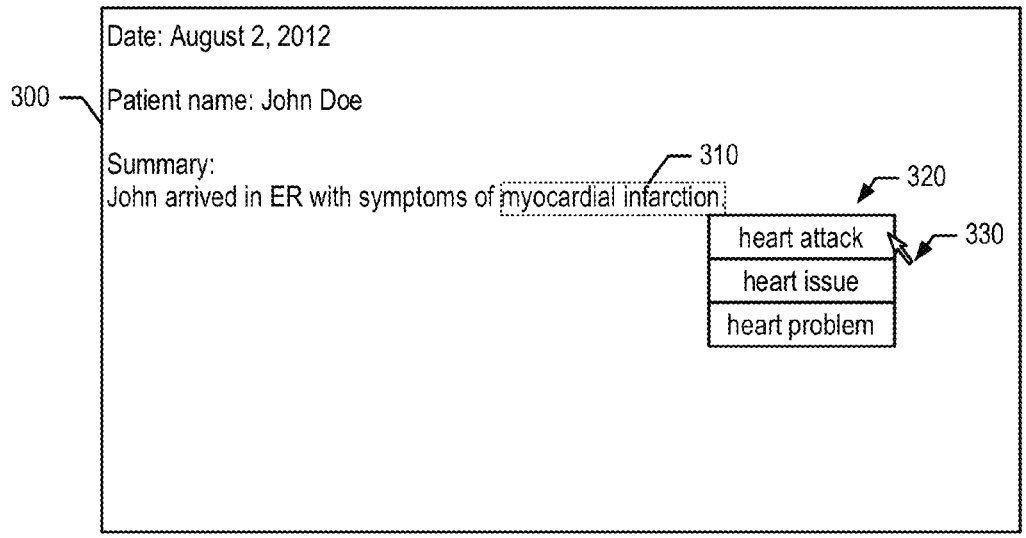
FIG. 3A is a diagram showing a conversion manager monitoring user text entry real-time and offering conversion selections.
Figure 3B:
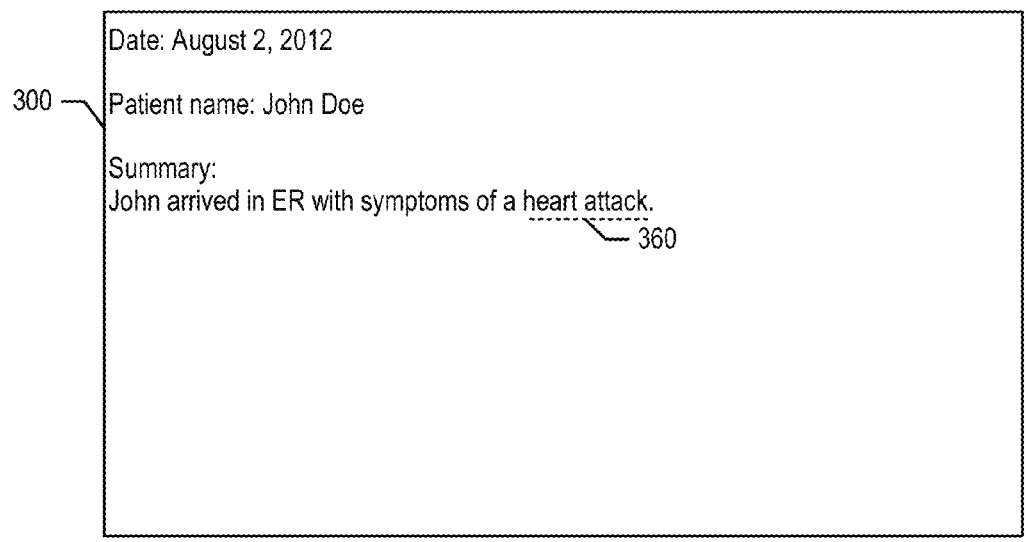
FIG. 3B is a diagram showing a result of conversion manager 100 converting a complex term to a laymen term in real-time.

In turn, user 115 selects one of the term suggestions (conversion selection 160) and conversion manager 100 replaces the term (replacement term 165) with the selected conversion term (see FIG. 3B and corresponding text for further details).

During a non-real time conversion scenario, user 115 provides (via conversion request 120) one or more document names that include terms for conversion manager 100 to convert. Conversion manager 100 retrieves corresponding documents 170 from documents 180 along with the corresponding conversion table(s) from conversion table store 140. In turn, conversion manager 100 proceeds to convert terms in each of documents 170 and store the converted documents (converted documents 190) in documents store 180 (see FIGS. 4A, 4B, 6, and corresponding text for further details).

Figure 2:
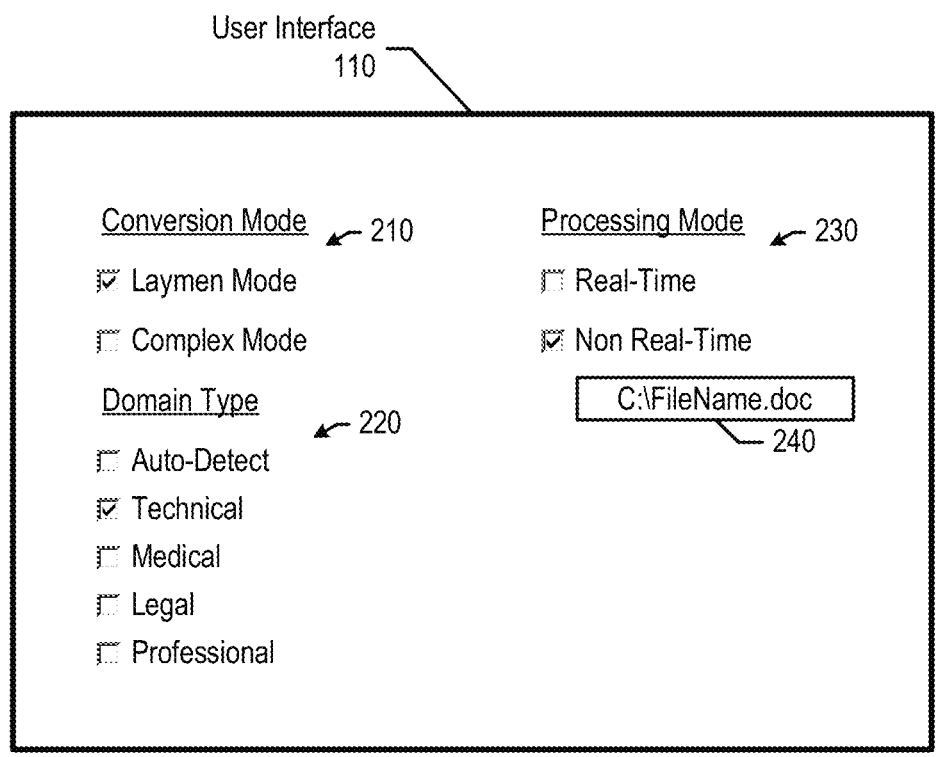
FIG. 2 is a diagram showing a user interface that is displayed to a user, which allows the user to select various conversion parameters.

FIG. 2 is a diagram showing a user interface that is displayed to a user, which allows the user to select various conversion parameters. User interface 110 includes conversion mode selection area 210, domain type selection area 220, and processing mode selection area 230. When a user selects a non real-time processing mode, the user includes the document names in text area 240 for conversion manager 100 to retrieve and convert terms according to selections made in areas 210 and 220. As those skilled in the art can appreciate, user interface 110 may include more or less selections that what is shown in FIG. 2.

FIG. 3A is a diagram showing a conversion manager monitoring user text entry real-time and offering conversion selections. User 115 begins composing a letter in window 300 and types term 310, which is a complex medical term. Conversion manager 100 detects and highlights term 310, and provides three conversion term suggestions in drop-down menu 320. As such, user 115 uses pointer 330 to select one of the three conversion term suggestions (see FIG. 3B and corresponding text for further details).

Conversion manager 100 identifies conversion term suggestions based upon a conversion table according to user 115's domain type selection. For example, user 115 may have selected "medical domain" as a domain type selection. In another example, user 115 may have selected "auto-detect" as a domain type selection. In this example, conversion manager 100 analyzes user 115's text entry and determines that the page of text corresponds to a medical domain type (see FIG. 6 and corresponding text for further details).

FIG. 3B is a diagram showing a result of conversion manager 100 converting a complex term to a laymen term in real-time. Referring back to FIG. 3A, user 115 selected "heart attack" as a conversion selection to replace complex term 310. As such, FIG. 3B shows that conversion manager 100 replaced complex term 310 with laymen term 360. In one embodiment, conversion manager 100 may highlight convertible terms within a page of text as user 115 types and, after user 115 finishes typing the letter, conversion manager may provide corresponding drop-down conversion term selections as user 115 hovers pointer 330 over each of the highlighted terms.

FIGS. 4A and 4B are diagrams showing conversion manager 100 converting laymen terms to complex terms in a non-real time processing mode environment. Page of text 400 includes various laymen terms that are underlined for illustration purposes. Conversion manager 100 analyzes page of text 400 and converts the laymen terms to complex terms using a conversion table that corresponds to the domain type selection to produce page of text 410. Similar to that discussed above, user 115 may have selected "medical domain" as a domain type selection or "auto-detect" as a domain type selection. When user 115 selects auto-detect, conversion manager 100 analyze page of text 400 to determine that its corresponding domain type is a medical domain based upon the complex terms included in the page of text.

Figure 5:
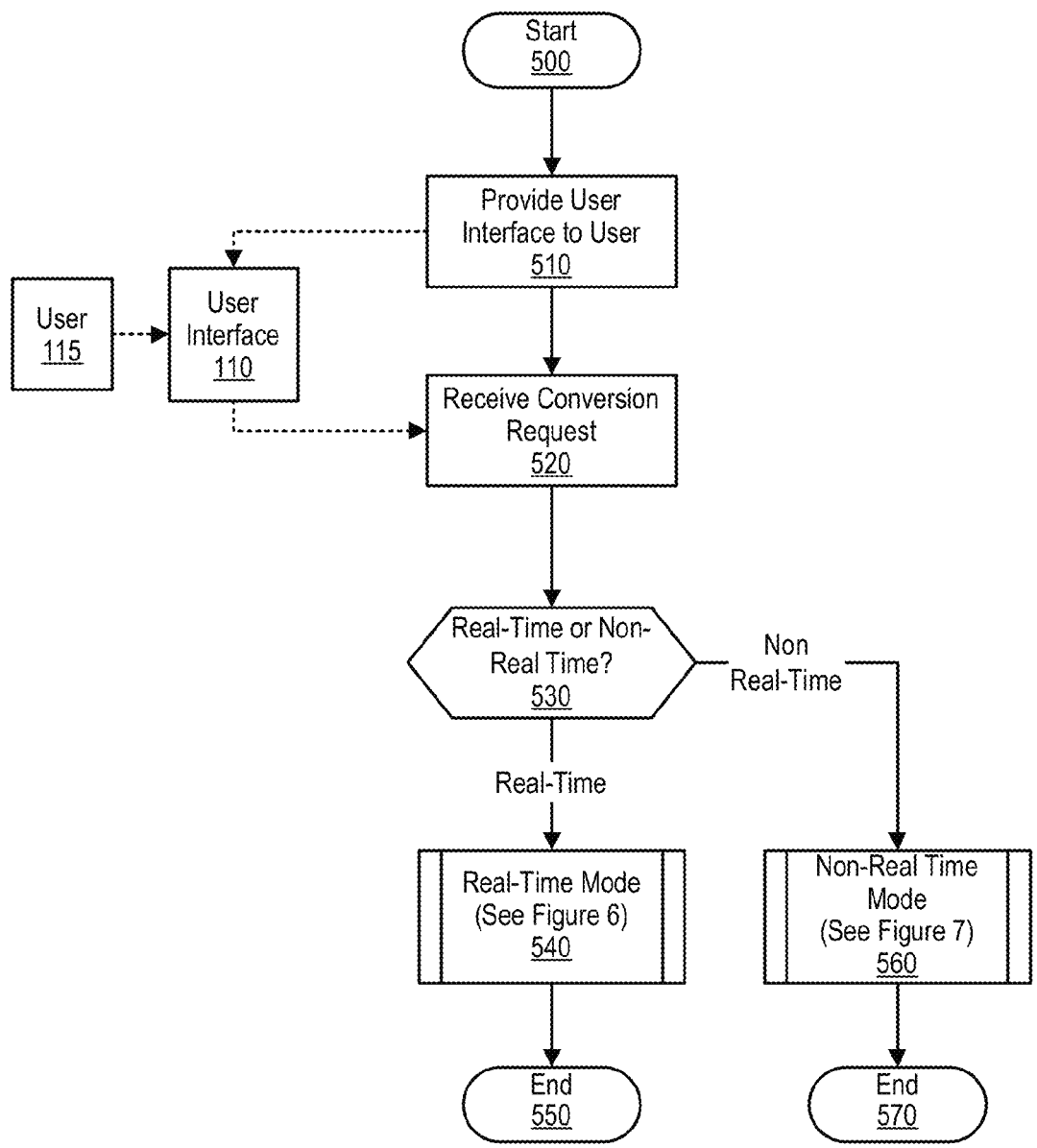
FIG. 5 is a flowchart showing steps taken in a conversion manager receiving a request from a user to convert terms included in a page of text.

FIG. 5 is a flowchart showing steps taken in a conversion manager receiving a request from a user to convert terms included in a page of text. Processing commences at 500, whereupon the conversion manager provides user interface 110 to user 115 at step 510. User 115 selects various conversion parameters, which the conversion manager receives at 520 via a conversion request.

A determination is made as to whether the user selects a real-time processing mode or a non real-time processing mode (decision 530). If user 115 selected a real-time processing mode, decision 530 branches to the "real-time" branch whereupon the conversion manager converts a page of text in a real-time processing mode environment (pre-defined processing block 540, see FIG. 6 and corresponding text for further details). Processing ends at 550.

Figure 7:
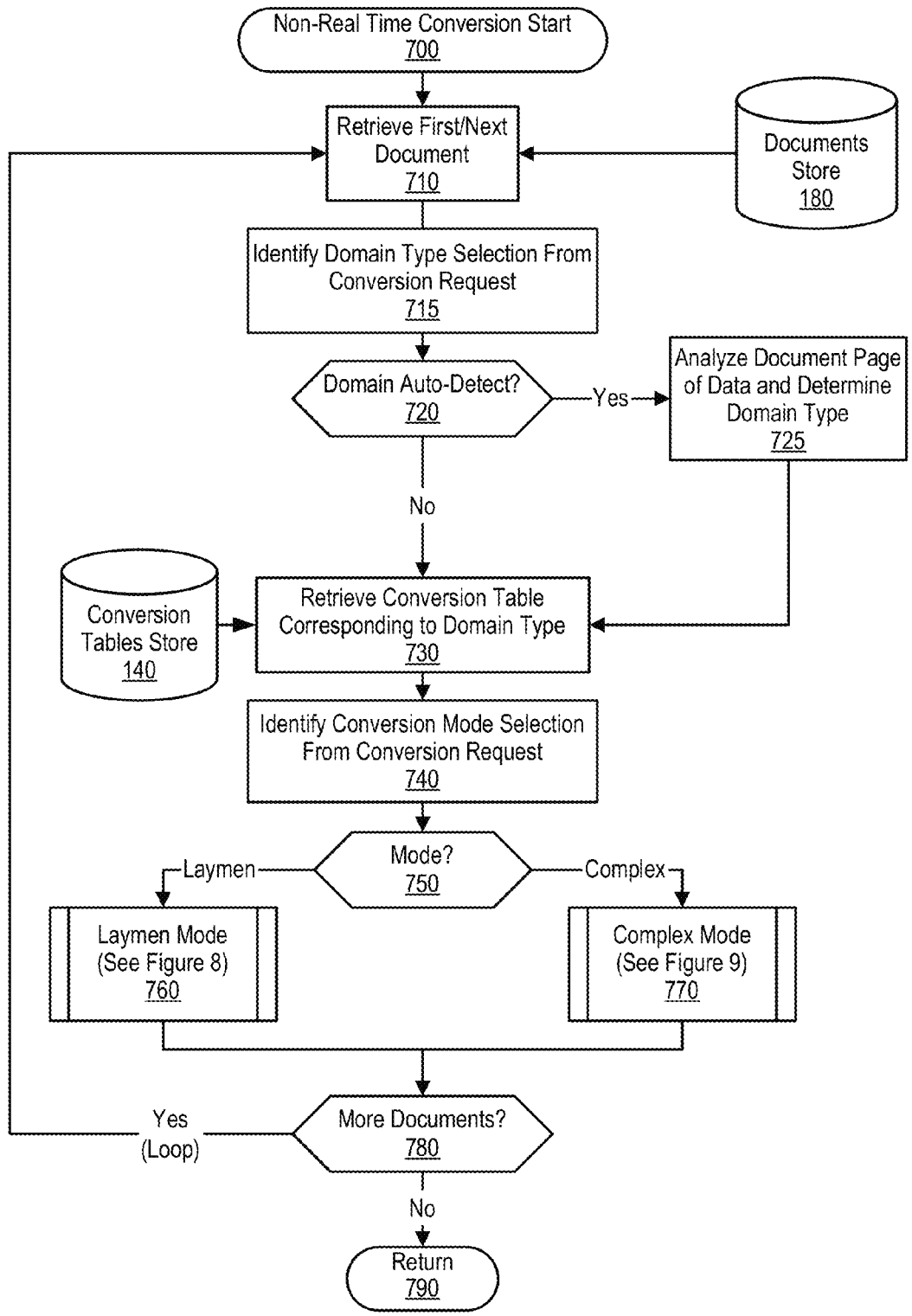
FIG. 7 is a flowchart showing steps taken in converting a page of text in a non-real-time processing mode environment.

On the other hand, if user 115 selected a non real-time processing mode, decision 530 branches to the "non real-time" branch whereupon the conversion manager converts one or more documents' pages of data in a non-real-time processing mode environment (pre-defined processing block 560, see FIG. 7 and corresponding text for further details). Processing ends at 570.

Figure 6:
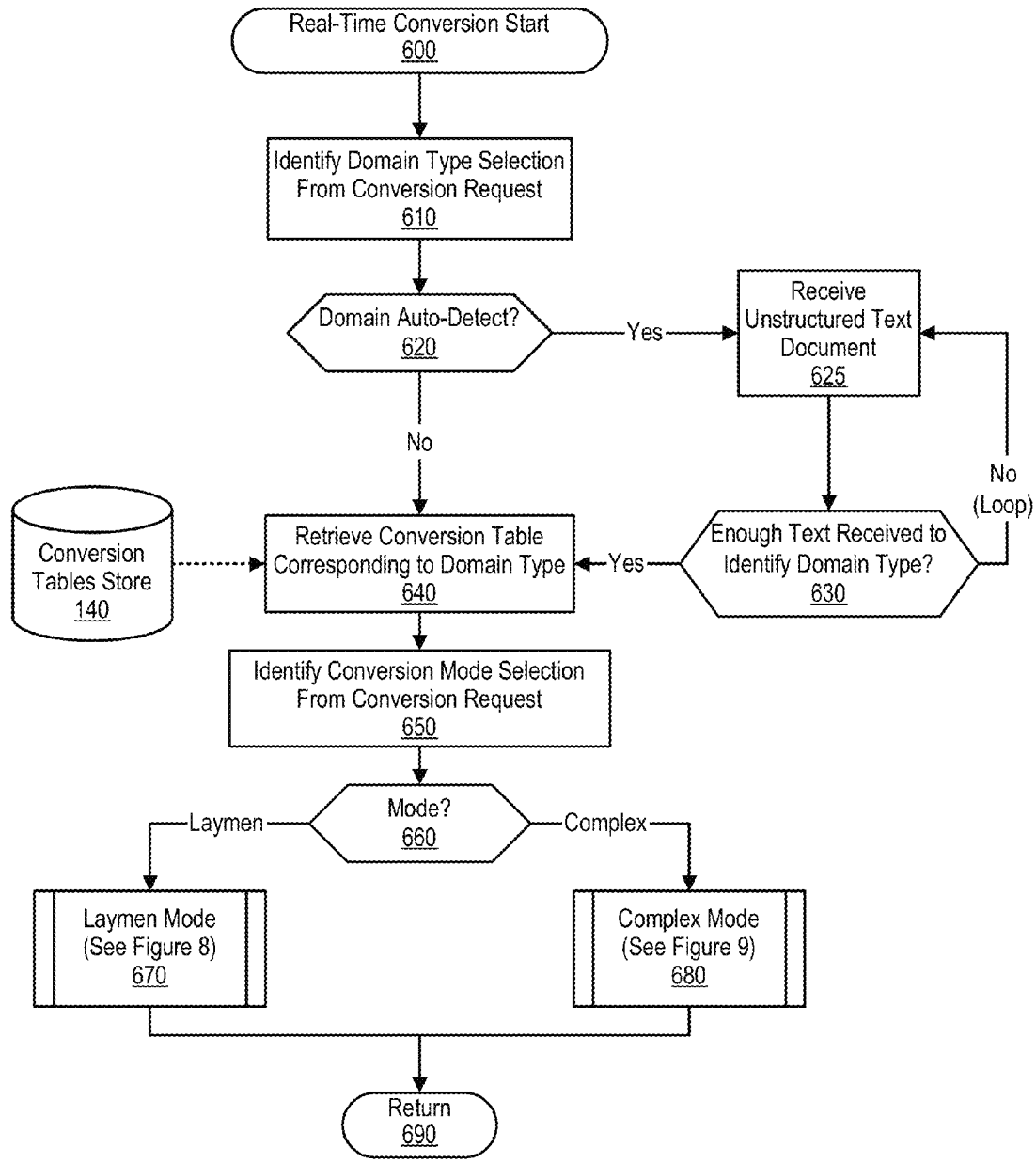
FIG. 6 is a flowchart showing steps taken in converting a page of text in a real-time processing mode environment.

FIG. 6 is a flowchart showing steps taken in converting a page of text in a real-time processing mode environment. Processing commences at 600, whereupon the conversion manager identifies the domain type selection from the conversion request generated by user 115 (step 610).

A determination is made as to whether the user selected an auto-detect domain type as the domain type selection (decision 620). If the user selected a particular domain type (e.g., medical), decision 620 branches to the "No" branch, whereupon the conversion manager retrieves the corresponding conversion table from conversion table store 140 at step 640.

On the other hand, if the user chose an auto-detect domain type selection, decision 610 branches to the "Yes" branch, whereupon the conversion manager receives and monitors text entries from user 115 at step 625. A determination is made as to whether user 115 entered enough text for the conversion manager to determine the domain type (decision 630). If not, decision 630 branches to the "No" branch, whereupon processing loops back to receive more text entries from user 115. This looping continues until the conversion manager is able to determine the domain type, at which point decision 630 branches to the "Yes" branch, whereupon the conversion manager retrieves a conversion table from conversion table store 140 that corresponds to the determined domain type.

At step 650, the conversion manager identifies a conversion mode selection from the conversion request. In one embodiment, user 115 may select a laymen conversion mode, which instructs the conversion manager to convert complex terms to laymen terms. Conversely, user 115 may select a complex conversion mode, which instructs the conversion manager to convert laymen terms to complex terms.

A determination is made as to user 115's conversion mode selection (decision 660). If user 115 selected a laymen conversion mode, decision 660 branches to the "Laymen" branch, whereupon the conversion manager converts complex terms to laymen terms (pre-defined process block 670, see FIG. 8 and corresponding text for further details). On the other hand, if user 115 selected a complex conversion mode, decision 660 branches to the "Complex" branch, whereupon the conversion manager converts laymen terms to complex terms (pre-defined process block 680, see FIG. 9 and corresponding text for further details). Processing returns at 690.

FIG. 7 is a flowchart showing steps taken in converting a page of text in a non-real-time processing mode environment. Processing commences at 700, whereupon the conversion manager retrieves a first document (includes one or more pages of data) from documents store 180 (step 710). At step 715, the conversion manager identifies the domain type selection from the conversion request generated by user 115. In one embodiment, user 115 may select different domain types for different documents.

A determination is made as to whether the user selected an auto-detect domain type (for the retrieved document) as the domain type selection (decision 720). If the user selected a particular domain type (e.g., medical), decision 720 branches to the "No" branch, whereupon the conversion manager retrieves the corresponding conversion table from conversion table store 140 at step 730.

On the other hand, if the user chose an auto-detect domain type selection, decision 720 branches to the "Yes" branch, whereupon the conversion manager analyzes the retrieved document and determines a domain type for the retrieved document (step 725). At step 730, the conversion manager retrieves a conversion table from conversion table store 140 that corresponds to the determined domain type.

At step 740, the conversion manager identifies a conversion mode selection from the conversion request. In one embodiment, user 115 may specify a conversion mode for each document on an individual document basis. A determination is made as to user 115's conversion mode selection (decision 750). If user 115 selected a laymen conversion mode, decision 750 branches to the "Laymen" branch, whereupon the conversion manager converts complex terms included in the document to laymen terms (pre-defined process block 760, see FIG. 8 and corresponding text for further details). On the other hand, if user 115 selected a complex conversion mode, decision 750 branches to the "Complex" branch, whereupon the conversion manager converts laymen terms included in the document to complex terms (pre-defined process block 770, see FIG. 9 and corresponding text for further details).

A determination is made as to whether user 115 specified more documents to convert (decision 780). If there are more documents to convert, decision 780 branches to the "Yes" branch, which loops back to retrieve the next document and convert terms in the document. This looping continues until there are no more documents to process, at which point decision 780 branches to the "No" branch, whereupon processing returns at 790.

Figure 8:
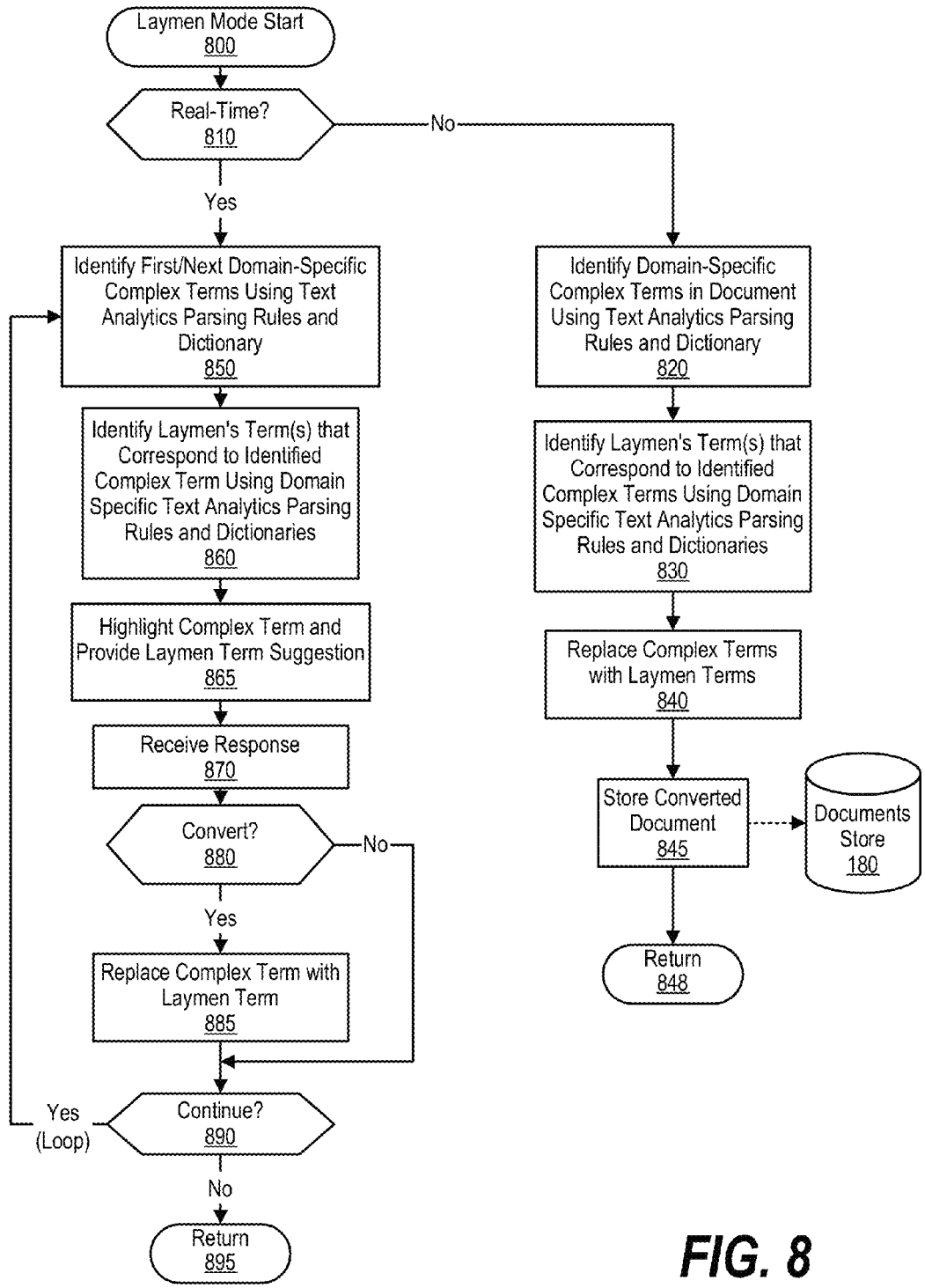
FIG. 8 is a flowchart showing steps taken in converting complex terms to laymen terms.

FIG. 8 is a flowchart showing steps taken in converting complex terms to laymen terms. Processing commences at 800, whereupon a determination is made as to whether user 115 selected a real-time processing mode (decision 810). If the user selected a non-real-time processing mode, decision 810 branches to the "No" branch, whereupon the conversion manager identifies domain-specific complex terms in the document's page of text using text analytics parsing rules and a dictionary (step 820).

In one embodiment, the conversion manager uses a complex term annotator to identify complex terms, which includes domain-specific rules and dictionaries that include complex terms (e.g., "hypertension"). For example, the complex term may utilize the following rules to analyze a document:

Rule 1 (Complex term Rule): <Disease Name> AND <Complex Term Dictionary>

Rule 2 (Non-complex term rule): (<Complex Term Dictionary> followed by <Organization Postfix>) or (<Organization Prefix> followed by <Complex Term Dictionary>)

In this example, when the conversion manager analyzes the text "John has hypertension. He was given information about American Society of Hypertension to learn more about the condition," the conversion manager identifies the first instance of "hypertension" as a complex term (based on rule 1), but does not identify the second instance of "hypertension" as a complex term because it is followed by "American Society" (rule 2).

Once complex terms are identified, the conversion manager identifies possible values to replace the complex term using a conversion table (step 830). The conversion manager replaces the complex terms with the laymen terms at step 840, and stores the converted document in documents store 180 at step 845. Processing returns at 848.

Referring back to decision 810, if the user selected the real-time processing mode, decision 810 branches to the "Yes" branch, whereupon the conversion manager monitors text input and identifies a domain-specific complex term entered by user 115 (step 850). At step 860, the conversion manager identifies one or more laymen terms corresponding to the identified complex term using text analytics parsing rules and a dictionary. The conversion manager highlights the identified complex term and provides conversion term suggestions to user 115 at step 865. At step 870, the conversion manager receives a conversion response from the user.

A determination is made as to whether user 115 wishes to convert the complex term to one of the suggested laymen terms (decision 880). If user 115 wishes to convert the complex term, decision 880 branches to the "Yes" branch, whereupon the conversion manager replaces the complex term with the laymen term selected by user 115 (step 885).

On the other hand, if user 115 does not wish to convert the complex term, decision 880 branches to the "No" branch, bypassing step 885.

A determination is made as to whether to continue to monitor user 115's text entries (decision 890). If the conversion manager should continue to monitor user 115's text entries and provide suggestions to convert complex terms to laymen terms, decision 890 branches to the "Yes" branch, which loops back to continue monitoring user 115's text entries. This looping continues until the conversion manager should stop monitoring user 115's text entries (e.g., user 115 is finished typing a document), at which point decision 890 branches to the "No" branch, whereupon processing returns at 895.

Figure 9:
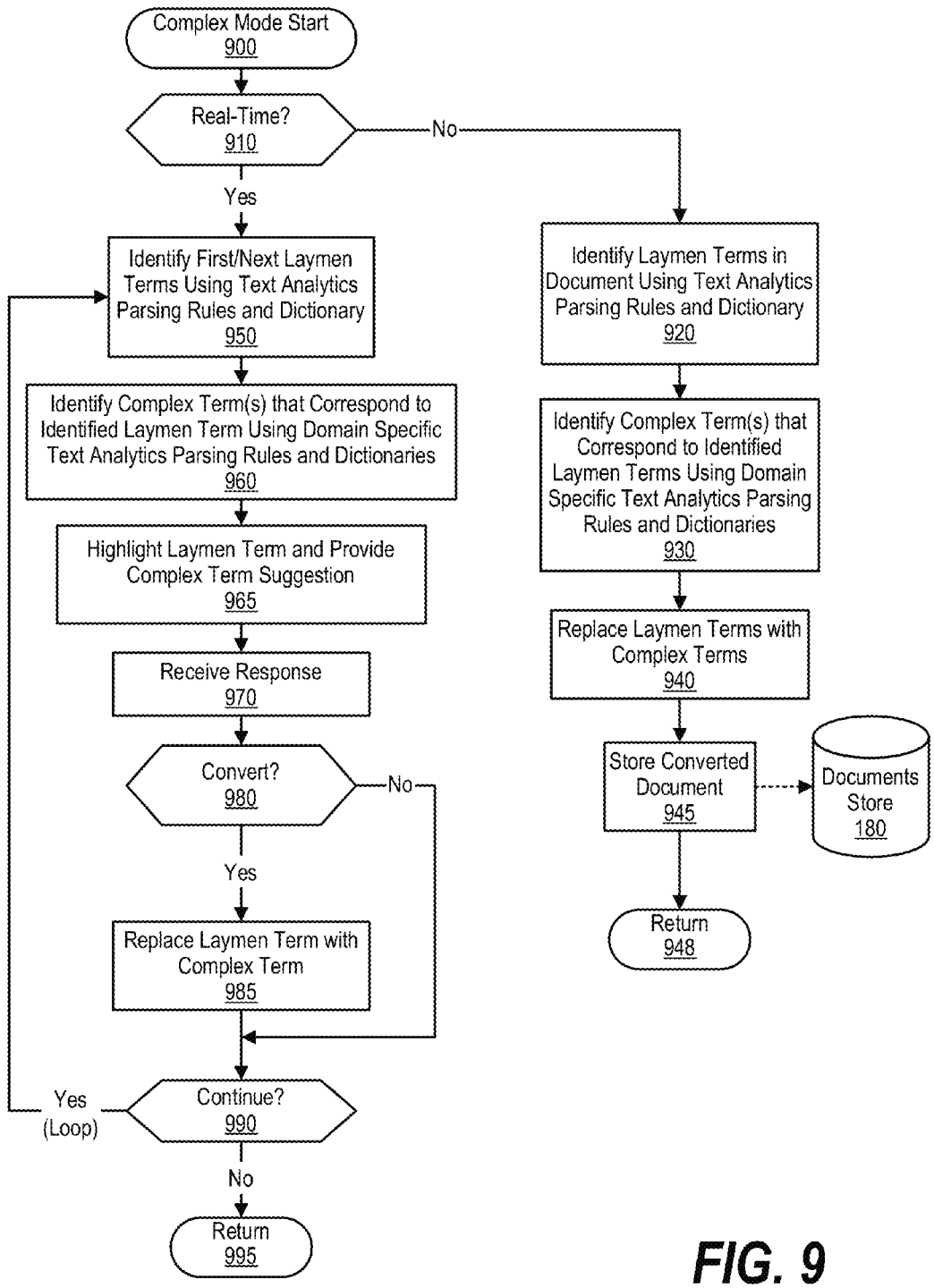
FIG. 9 is a flowchart showing steps taken in converting laymen terms to complex terms.

FIG. 9 is a flowchart showing steps taken in converting laymen terms to complex terms. Processing commences at 900, whereupon a determination is made as to whether user 115 selected a real-time processing mode (decision 910). If the user selected a non-real-time processing mode, decision 910 branches to the "No" branch, whereupon the conversion manager identifies laymen terms in the document's page of text using text analytics parsing rules and a dictionary (step 920).

In one embodiment, the conversion manager uses a layman term annotator to identify layman terms, which includes domain-specific rules and dictionaries that include layman terms (e.g., "heart attack"). For example, the layman term may utilize the following rules to analyze a document:

Rule 1 (Layman term Rule): <Disease Name> AND <Layman Term Dictionary>

Rule 2 (Non-layman term rule): (<Layman Term Dictionary> followed by <Organization Postfix>) or (<Organization Prefix> followed by <Layman Term Dictionary>)

In this example, when the conversion manager analyzes the text "John arrived in ER with symptoms of heart attack. He was given information about American Heart Attack Association to learn more about the disease," the conversion manager identifies the first instance of "heart attack" as a layman term (based on rule 1), but does not identify the second instance of "heart attack" as a layman term because it is followed by "Association" (rule 2).

Once layman terms are identified, the conversion manager identifies possible values to replace the layman terms using a conversion table (step 930). The conversion manager replaces the laymen terms with the complex terms at step 940, and stores the converted document in documents store 180 at step 945. Processing returns at 948.

Referring back to decision 910, if the user selected the real-time processing mode, decision 910 branches to the "Yes" branch, whereupon the conversion manager monitors text input and identifies a laymen term entered by user 115 (step 950). At step 960, the conversion manager identifies one or more domain-specific complex terms corresponding to the identified laymen term using text analytics parsing rules and a dictionary. The conversion manager highlights the identified laymen term and provides conversion term suggestions to user 115 at step 965. At step 970, the conversion manager receives a conversion response from the user.

A determination is made as to whether user 115 wishes to convert the laymen term to one of the suggested complex terms (decision 980). If user 115 wishes to convert the laymen term, decision 980 branches to the "Yes" branch, whereupon the conversion manager replaces the laymen term with the complex term selected by user 115 (step 985).

On the other hand, if user 115 does not wish to convert the laymen term, decision 980 branches to the "No" branch, bypassing step 985.

A determination is made as to whether to continue to monitor user 115's text entries (decision 990). If the conversion manager should continue to monitor user 115's text entries and provide suggestions to convert laymen terms to complex terms, decision 990 branches to the "Yes" branch, which loops back to continue monitoring user 115's text entries. This looping continues until the conversion manager should stop monitoring user 115's text entries (e.g., user 115 is finished typing a document), at which point decision 990 branches to the "No" branch, whereupon processing returns at 995.

Figure 10:
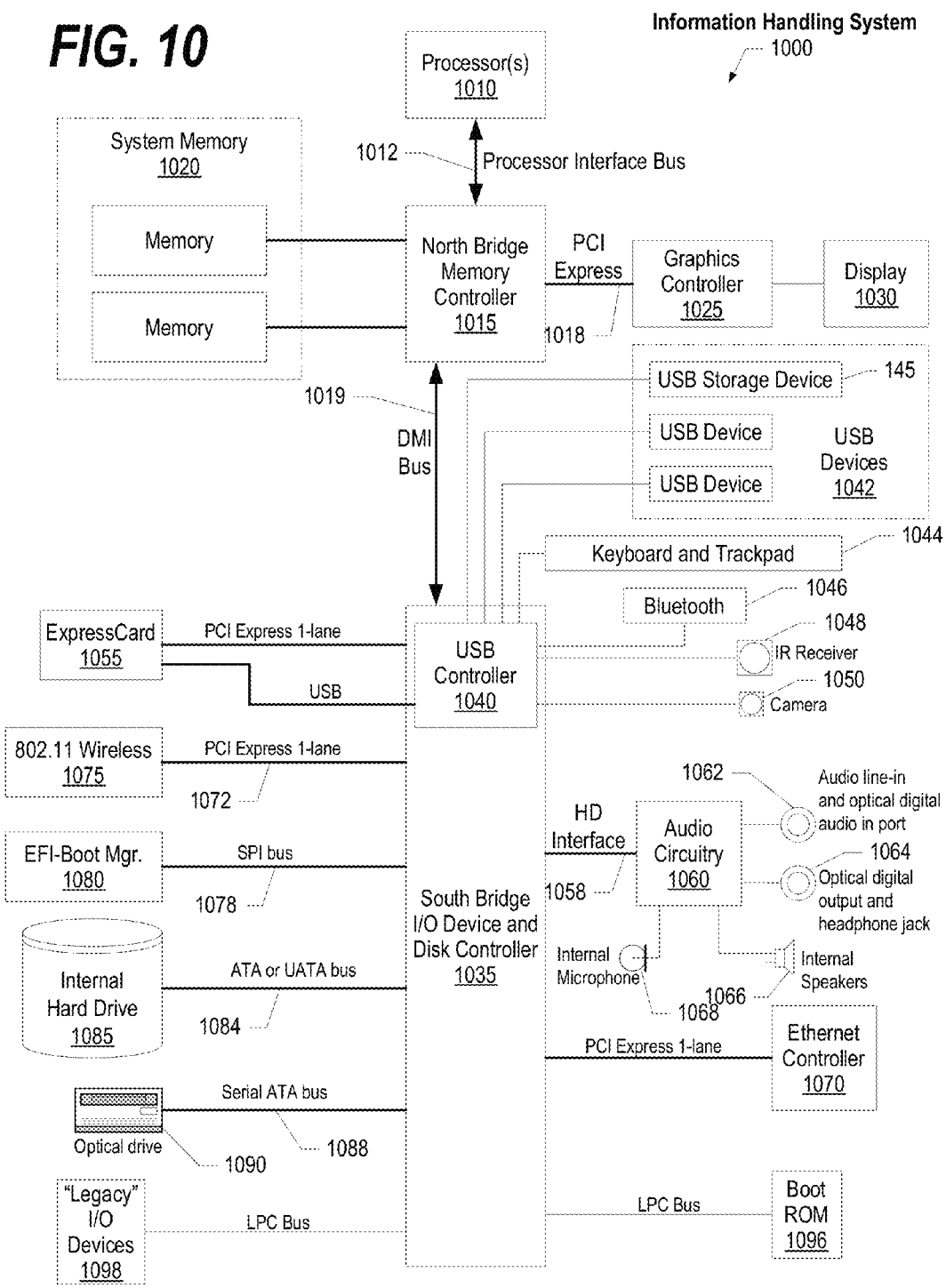
FIG. 10 is a block diagram of a data processing system in which the methods described herein can be implemented.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display device 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage device controller, which connects Southbridge 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to Southbridge 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 connects to Southbridge 1035 using Serial ATA (SATA) bus 1088. Serial ATA adapters and devices communicate over a high-speed serial link. The Serial ATA bus also connects Southbridge 1035 to other forms of storage devices, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

Figure 11:
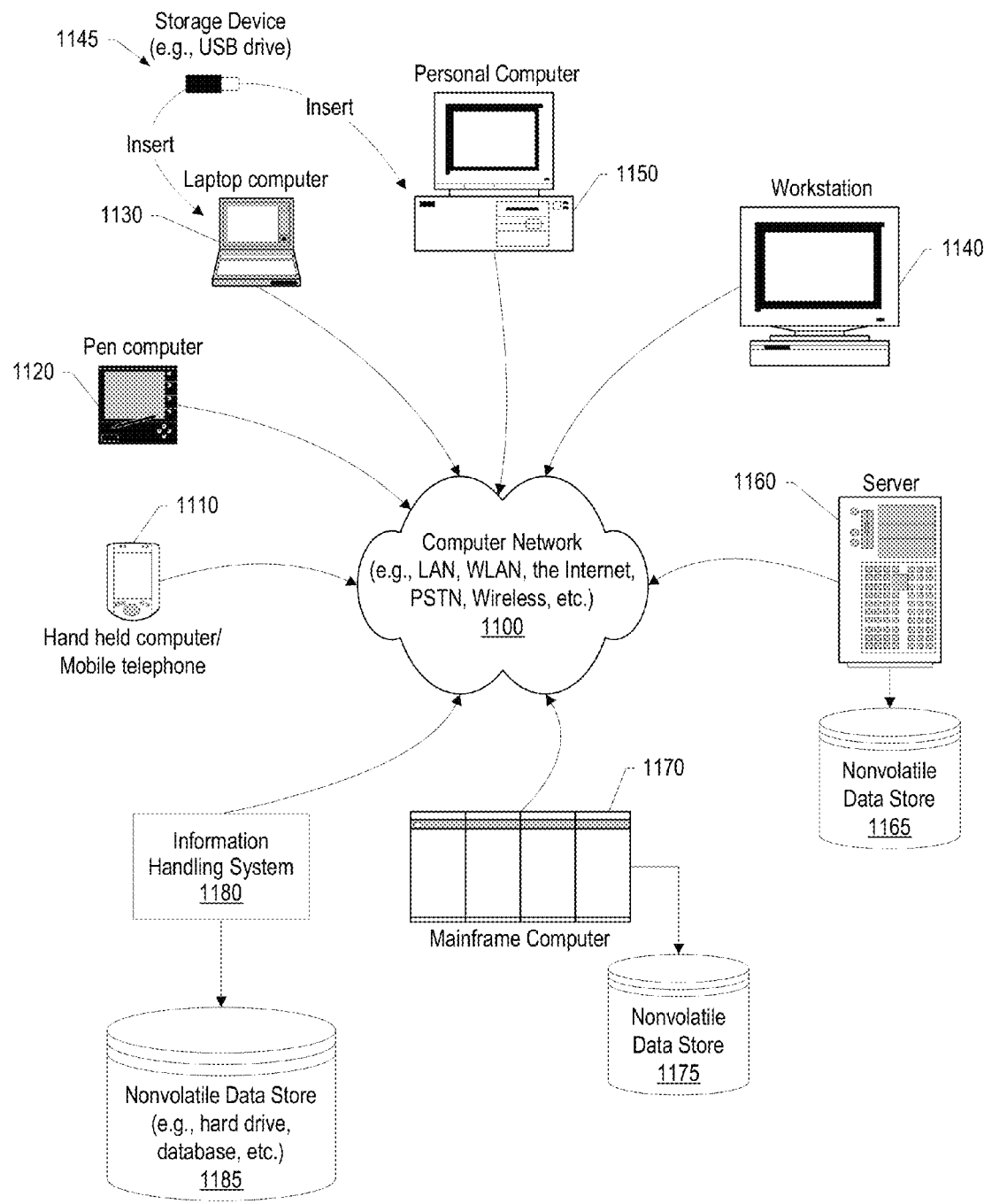
FIG. 11 provides an extension of the information handling system environment shown in FIG. 10 to illustrate that the methods described herein can be performed on a wide variety of information handling systems which operate in a networked environment.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and FIG. 11 provides an extension of the information handling system environment shown in FIG. 10 to illustrate that the methods described herein can be performed on a wide variety of information handling systems that operate in a networked environment. Types of information handling systems range from small handheld devices, such as handheld computer/mobile telephone 1110 to large mainframe systems, such as mainframe computer 1170. Examples of handheld computer 1110 include personal digital assistants (PDAs), personal entertainment devices, such as MP3 players, portable televisions, and compact disc players. Other examples of information handling systems include pen, or tablet, computer 1120, laptop, or notebook, computer 1130, workstation 1140, personal computer system 1150, and server 1160. Other types of information handling systems that are not individually shown in FIG. 11 are represented by information handling system 1180. As shown, the various information handling systems can be networked together using computer network 1100. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 11 depicts separate nonvolatile data stores (server 1160 utilizes nonvolatile data store 1165, mainframe computer 1170 utilizes nonvolatile data store 1175, and information handling system 1180 utilizes nonvolatile data store 1185). The nonvolatile data store can be a component that is external to the various information handling systems or can be internal to one of the information handling systems. In addition, removable nonvolatile storage device 1145 can be shared among two or more information handling systems using various techniques, such as connecting the removable nonvolatile storage device 1145 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
   receiving a conversion request that includes a real-time processing mode selection corresponding to a first category and a second category;
   selecting a domain type based on a received portion of unstructured text in response to determining that the received portion of unstructured text is sufficient to perform the selection of the domain type from a plurality of domain types;
   subsequent to selecting the domain type, dynamically monitoring one or more additional portions of the unstructured text entered in real-time and identifying one or more first terms included in the one or more additional portions of the unstructured text, the one or more identified first terms included in a plurality of first terms corresponding to the first category;
   selecting one or more second terms based upon the selected domain type that correspond to the identified one or more first terms, the selected one or more second terms included in a plurality of second terms corresponding to the second category; and
   replacing the identified one or more first terms with their corresponding selected one or more second terms.

2. The method of claim 1 wherein the plurality of first terms and the plurality of second terms are of a same language.

3. The method of claim 2 further comprising:
   determining that a new text entry included in the one or more additional portions of the unstructured text matches one of the plurality of first terms;
   displaying one or more of the second terms corresponding to the new text entry;

receiving a conversion selection from the user that selects one of the displayed second terms; and replacing the new text entry with the selected second term.

4. The method of claim 2 wherein the first category is a laymen category and the second category is a profession-specific category.

5. The method of claim 2 wherein the first category is a profession-specific category and the second category is a layman category.

6. The method of claim 1 wherein the domain type is selected from the group consisting of a technical domain type, a medical domain type, a legal domain type, and a professional domain type.

7. A method comprising:

receiving a conversion request that identifies a conversion mode corresponding to a first category and a second category, the conversion request including a real-time processing mode selection;

selecting a domain type based on a received portion of unstructured text in response to determining that the received portion of unstructured text is sufficient to perform the selection of the domain type from a plurality of domain types;

subsequent to selecting the domain type, dynamically monitoring one or more additional portions of the unstructured text entered in real-time and identifying one or more first terms included in the one or more additional portions of the unstructured text, the one or more identified first terms included in a plurality of first terms corresponding to the first category;

selecting one or more second terms based upon the selected domain type that correspond to the identified one or more first terms, the selected one or more second terms included in a plurality of second terms corresponding to the second category, wherein the plurality of first terms and the plurality of second terms are of a same language;

displaying one or more of the second terms corresponding to the identified one or more first terms;

receiving a conversion selection from the user that selects one of the displayed second terms; and replacing the identified one or more first terms with the selected second term.

\* \* \* \* \*